US010870203B2

(12) United States Patent
Tarui et al.

(10) Patent No.: US 10,870,203 B2
(45) Date of Patent: Dec. 22, 2020

(54) MACHINE TOOL CONTROL DEVICE AND PRODUCTION SYSTEM

(71) Applicant: FANUC CORPORATION, Yamanashi (JP)

(72) Inventors: Yoshihiko Tarui, Yamanashi (JP); Yoshitsugu Ogawa, Yamanashi (JP); Yoshinori Hoshino, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 44 days.

(21) Appl. No.: 15/955,157

(22) Filed: Apr. 17, 2018

(65) Prior Publication Data
US 2018/0333846 A1 Nov. 22, 2018

(30) Foreign Application Priority Data

May 17, 2017 (JP) .................................. 2017-098040

(51) Int. Cl.
*B25J 9/16* (2006.01)
*B25J 11/00* (2006.01)
*G05B 19/418* (2006.01)

(52) U.S. Cl.
CPC ............ *B25J 9/1661* (2013.01); *B25J 9/161* (2013.01); *B25J 11/005* (2013.01); *G05B 19/41825* (2013.01); *G05B 2219/32129* (2013.01); *Y02P 90/02* (2015.11); *Y10S 901/02* (2013.01)

(58) Field of Classification Search
None
See application file for complete search history.

(56) References Cited

U.S. PATENT DOCUMENTS 8,014,898 B2 * 9/2011 Nishi ............... G05B 19/41825
318/565

FOREIGN PATENT DOCUMENTS

| CN | 101804632 | 8/2010 |
|----|-----------|--------|
| JP | 6-28019 | 2/1994 |
| JP | 6-37902 | 5/1994 |
| JP | 06-149329 | 5/1994 |
| JP | 2001-154717 | 6/2001 |

(Continued)

OTHER PUBLICATIONS

Notification of Reasons for Refusal dated Jan. 29, 2019 in Japanese Application No. 2017-098040.

(Continued)

*Primary Examiner* — Sean Shechtman
(74) *Attorney, Agent, or Firm* — Wedereroth, Lind & Ponack, L.LP.

(57) ABSTRACT

A machine tool control device and a production system are provided which determine an operation sequence of a robot and set numerical data required in operation, by setting the selection of an operating program of a robot, and/or setting of operations of the operating program, based on an instruction by the user from the machine tool side. A numerical control device which is connected to a robot control device for controlling a robot and controls a machine tool that is used in combination with the robot, includes: a reception unit that accepts setting information for the robot; and a sending unit for sending a parameter setting a selection of an operating program of the robot, and/or setting operations of the operating program, based on the setting information accepted by the reception unit.

10 Claims, 11 Drawing Sheets

(56) References Cited

FOREIGN PATENT DOCUMENTS

| | | |
|---|---|---|
| JP | 2010-191602 | 9/2010 |
| JP | 2015-168038 | 9/2015 |
| WO | 2013/027283 | 2/2013 |

OTHER PUBLICATIONS

Office Action dated Nov. 25, 2019 in CN Patent Application No. 201810455475.8.
Office Action dated May 11, 2020 in CN Patent Application No. 201810455475.8.

* cited by examiner i, j = 0~7

| ITEM | PARAMETER | SIGNAL |
|---|---|---|
| ROBOT SIMPLE SETTING ON/OFF | $M_{11}$ | $R_{11}$ |
| TYPE OF HAND | $M_{12}$ | $R_{12}$ |
| PLACEMENT UNMACHINED WORKPIECES | $M_{13}$ | $R_{13}$ |
| UFRAME_NUM | $M_{2i}$ | $R_{2i}$ |
| UTOOL_NUM | $M_{3i}$ | $R_{3i}$ |
| NUMBER OF WORKSPACES IN LONGITUDINAL DIRECTION | $M_{4i}$ | $R_{4i}$ |
| NUMBER OF WORKSPACES IN LATERAL DIRECTION | $M_{5i}$ | $R_{5i}$ |
| VERTICAL GRID SPACING | $M_{6i}$ | $R_{6i}$ |
| HORIZONTAL GRID SPACING | $M_{7i}$ | $R_{7i}$ |

# MACHINE TOOL CONTROL DEVICE AND PRODUCTION SYSTEM

This application is based on and claims the benefit of priority from Japanese Patent Application No. 2017-098040, filed on 17 May 2017, the content of which is incorporated herein by reference.

BACKGROUND OF THE INVENTION

Field of the Invention

The present invention relates to a machine tool control device and a production system.

Related Art

In recent years, for shortening of the cycle time in machining using a machine tool, industrial robots have come to be used in the mounting/unmounting operations of workpieces. The machine tools and robots used in machining are each controlled by control devices. Herein, a general control device of a machine tool such as a lathe or machining center is referred to as a machine tool control device. Then, in the case of a special purpose machine tool designed for a specific application, PLC (programmable logic controller) software is executed by the machine tool control device.

The machine tool control device generally includes a display and/or operation panel for manipulating the machine tool. The display and/or operation panel are often securely installed at a position in front of the machine tool, so that the machining status can be confirmed by sight. On the other hand, the control device of a robot is called a robot control device. The robot control device includes a teaching control panel which can be carried by the user and is for manipulating the robot.

In addition, even in a case of the control device of either of the machine tool and robot, the target of display and/or manipulation by way of the display and/or operation panel provided to the control device is generally limited to the machine tool or robot controlled by the control device thereof. In order to construct a system constituted from such a machine tool and robot, in addition to the creation of a machining program for the machine tool, setting must be performed on the robot side. However, the setting operation on the robot side must be performed at the teaching control panel of the robot. For a user of the machine tool who is inexperienced in handling of the teaching operation panel of the robot, it is difficult to perform setting by oneself. In this regard, for example, a robot control device has been disclosed that controls a robot which performs the supply and discharge of a workpiece (for example, refer to Patent Document 1).

Patent Document 1: Japanese Unexamined Patent Application, Publication No. 2015-168038

SUMMARY OF THE INVENTION

In Patent Document 1, the robot control device causes the robot to operate in accordance with a predetermined pattern, according to the data indicating an operating state of the machine tool, which was acquired at a predetermined timing from the machine tool control device. Consequently, data other than the operating state has not been considered.

The present invention provides a machine tool control device and production system which determine an operating sequence of a robot and set the numerical data required in operation, by setting a selection of the operating program of the robot and/or setting operations of the operating program, in accordance with an instruction by the user from the machine tool side.

A machine tool control device (for example, "numerical control device 100, 100-2, 100-3" described later) according to a first aspect of the present invention is connected to a robot control device (for example, "robot control device 400" described later) for controlling a robot (for example, "robot 300" described later), and controls a machine tool (for example, "machine tool 200" described later) which is used in combination with the robot, the machine tool control device including: a reception unit (for example, "reception unit 120" described later) for accepting setting information for the robot; and a sending unit (for example, "signal allocation unit 140" described later) for sending a parameter setting a selection of an operating program (for example, "operating programs 503, 513, 523, 543a" described later) of the robot and/or setting an operation of the operating program, based on the setting information accepted by the reception unit.

According to a second aspect of the present invention, in the machine tool control device as described in the first aspect, the parameter may select the operating program from a plurality of operating programs which are executable by the robot control device.

According to a third aspect of the present invention, in the machine tool control device (for example, "numerical control device 100" described later) as described in the first or second aspect, the parameter may input a numerical value into a variable of the operating program.

According to a fourth aspect of the present invention, in the machine tool control device (for example, "numerical control device 100, 100-2" described later) as described in any one of the first to third aspects, the parameter may correspond to branch processing of the operating program.

According to a fifth aspect of the present invention, in the machine tool control device (for example, "numerical control device 100" described later) as described in any one of the first to fourth aspects, the parameter may correspond to a type of hand, arrangement of an unmachined workpiece and arrangement of a machined workpiece.

According to a sixth aspect of the present invention, in the machine tool control device (for example, "numerical control device 100, 100-2, 100-3" described later) as described in any one of the first to fifth aspects, the sending unit (for example, "signal allocation unit 140" described later) may allocate the parameter as an input signal to the robot control device (for example, "robot control device 400" described later).

According to a seventh aspect of the present invention, the machine tool control device (for example, "numerical control device 100, 100-3" described later) as described in any one of the first to sixth aspects may further include: a display (for example, "display/MDI unit 70" described later) which displays a screen; a designation screen output unit (for example, "designation screen output unit 110" described later) for outputting a designation screen (for example, "designation screen. 502, 512, 522a, 522b" described later) for designating the setting information to the display, in which the reception unit (for example, "reception unit 120" described later) may accept the setting information according to an instruction input corresponding to display on the designation screen.

According to an eighth aspect of the present invention, the machine tool control device (for example, "numerical control device 100-2" described later) as described in any one of the first to sixth aspects may further include: a switch (for example, "switch S1" described later) for designating the setting information, in which the reception unit (for example, "reception unit 120" described later) may accept a manipulation result of the switch as the setting information, and the sending unit (for example, "signal allocation unit 140" described later) may an input signal relative to the robot control device (for example, "robot control device 400" described later) which corresponds to the parameter, based on a manipulation result of the switch.

According to a ninth aspect of the present invention, the machine tool control device (for example, "numerical control device 100-3" described later) as described in any one of the first to eighth aspects may further include: a program acquisition unit (for example, "program acquisition unit 130" described later) for acquiring the operating program (for example, "operating program 543a" described later) which corresponds to the setting information accepted by the reception unit (for example, "reception unit 120" described later) and sent to the robot control device (for example, "robot control device 400" described later), and then sending the operating program thus acquired to the robot control device.

According to a tenth aspect of the present invention, in the machine tool control device (for example, "numerical control device 100, 100-2" described later) as described in any one of the first to eighth aspects, the sending unit (for example, "signal allocation unit 140" described later) may send, to the robot control device (for example, "robot control device 400" described later), the parameter setting the selection of the operating program (for example, "operating program 503, 513, 523" described later) stored in the robot control device (for example, "robot control device 400" described later), and/or setting an operation of the operating program.

A production system (for example, "production system 1000" described later) according to an eleventh aspect of the present invention includes: a robot control device (for example, "robot control device 400" described later) that controls a robot (for example, "robot 300" described later); and a machine tool control device (for example "machine tool control device 100, 100-2, 100-3" described later) that is connected to the robot control device, and controls a machine tool (for example, "machine tool 200" described later) which is used in combination with the robot, in which the machine tool control device includes: a reception unit (for example, "reception unit 120" described later) for accepting setting information for the robot; and a sending unit (for example, "signal allocation unit 140" described later) for sending, to the robot control device, a parameter setting a selection of an operating program (for example, "operating program 503, 513, 523, 543a" described later) of the robot, and/or setting an operation of the operating program, based on the setting information accepted by the reception unit, and in which the robot control device includes: a receiving unit (for example, "receiving unit 410" described later) for receiving the parameter; and a program setting unit (for example, "program setting unit 430" described later) for setting the operating program of the robot based on the parameter received by the receiving unit.

According to the present invention, it is possible to provide a machine tool control device and production system which determine an operating sequence of a robot and set the numerical data required in operation, by setting a selection of the operating program of the robot and/or setting operations of the operating program, in accordance with an instruction by the user from the machine tool side.

DETAILED DESCRIPTION OF THE INVENTION

Embodiments

Figure 1:
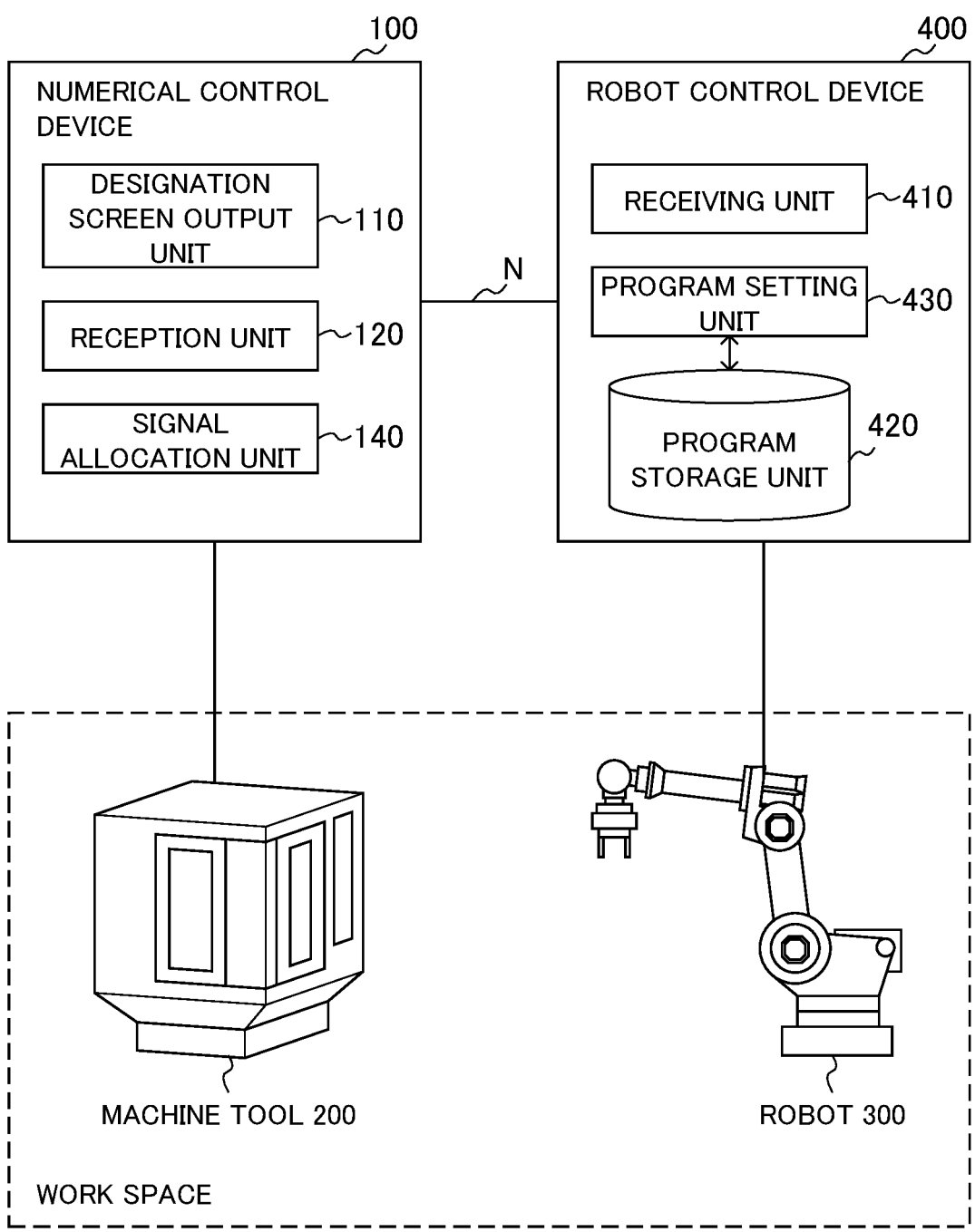
FIG. 1 provides a schematic diagram of a basic configuration of the present embodiment and a functional block diagram of a numerical control device and robot control device.
Figure 2:
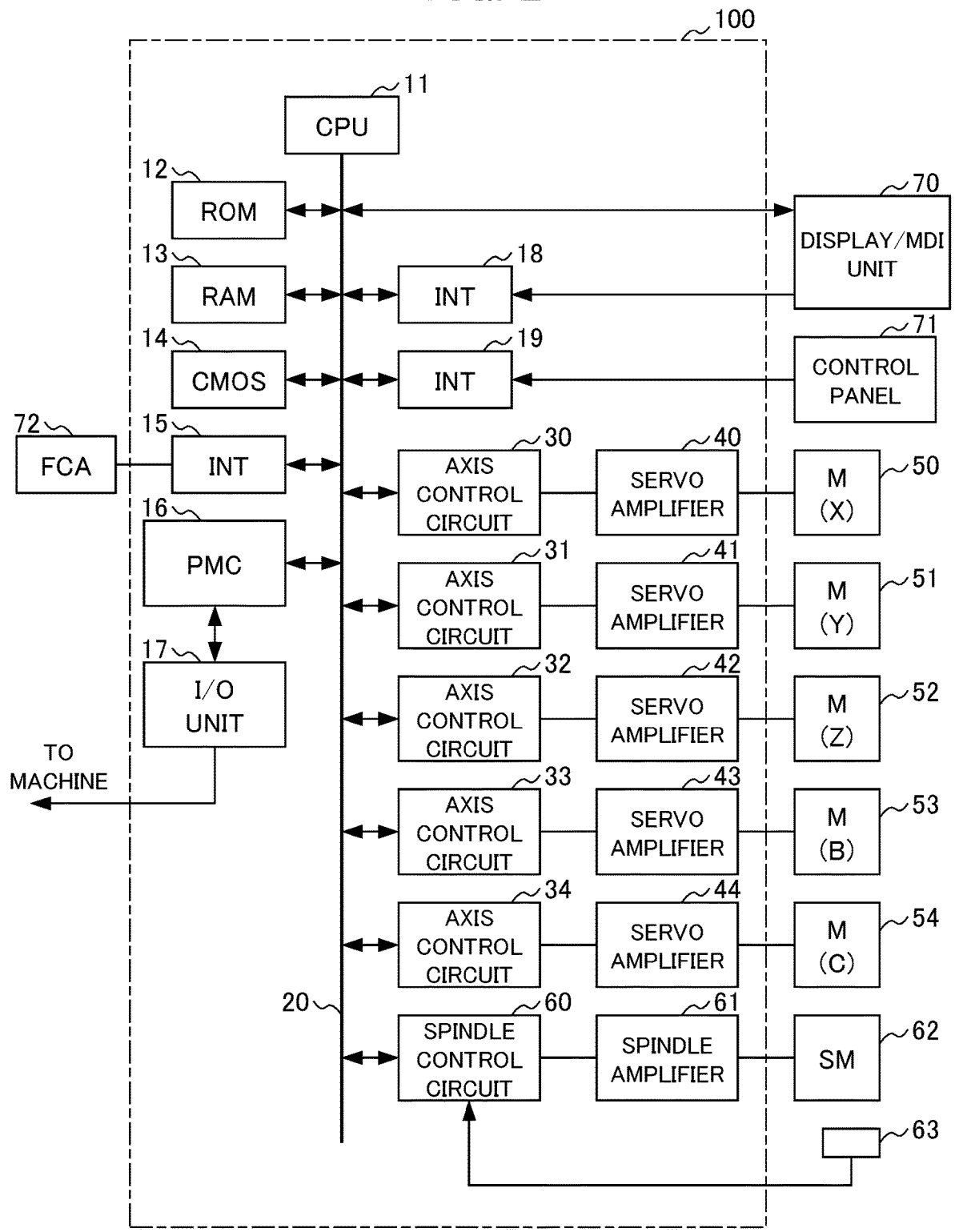
FIG. 2 is a block diagram of main parts of the numerical control device of the present embodiment.

The configuration of a production system 1000 according to the present embodiment will be explained. FIG. 1 is a schematic drawing of the basic configuration of the present embodiment and a functional block diagram of a numerical control device 100 and a robot control device 400. FIG. 2 is a block diagram of main parts of the numerical control device 100 in the present embodiment. The production system 1000 shown in FIG. 1 includes a numerical control device (CNC: Computerized Numerical Control) 100 (machine tool control device), a machine tool 200, a robot 300, and a robot control device 400. When the user makes an instruction using the numerical control device 100, this production system 1000 can control the robot 300 by the robot control device 400 executing an operating program for controlling the robot 300 in accordance with the instruction.

The numerical control device 100 and machine tool 200 are established in groups of one-to-one, and are connected to be communicable. It should be noted that the numerical control device 100 and machine tool 200 may be directly connected via a connection interface, and may be connected via a network such as a LAN (Local Area Network). In addition, the robot 300 and robot control device 400 are established in groups of one-to-one, and are connected to be communicable. Also in terms of the connection between the robot 300 and the robot control device 400, it may be directly connected via a connection interface, and may be connected via a network such as a LAN.

The numerical control device 100 and robot control device 400, for example, are connected via a network N, and are able to perform communication with each other. It should be noted that the network N may be a LAN constructed within a factory, the Internet, a public telephone network, or a combination of these, and may be connected directly via a connection interface. The specific communication method of the network N, and whether being either a wired connected or wireless connected, or the like, is not particularly limited.

The numerical control device 100 is a device for causing predetermined operations to be performed by the machine tool 200 by controlling the machine tool 200. Herein, the general configuration of the numerical control device 100 will be explained by referencing FIG. 2. A CPU 11 is a processor which controls the entirety of the numerical control device 100. The CPU 11 reads out a system program stored in ROM 12 via a bus 20, and controls the entirety of the numerical control device 100 following the system program. Temporal calculation data, display data, various kinds of data inputted by an operator via a display/MDI unit 70, etc. are stored in. RAM 13.

CMOS memory 14 is configured as non-volatile memory that is backed up by a battery (not illustrated) and in which the storage state is maintained even if the power source of the numerical control device 100 is turned off. It may be configured so that machining programs read via an interface 15 or inputted via the display/MDI unit 70 and causing predetermined operations to be performed by the machine tool 200, operating programs described later which are executed by the robot control device 400 and cause predetermined operations to be performed by the robot 300, etc. are stored In the CMOS memory 14. Various system programs for executing processing of editing mode necessitated for creation and editing of machining programs and operating programs, and processing for automated operation are written in advance in the ROM 12. The various programs such as machining programs and operating programs executing the present invention can be inputted via the interface 15 and/or display/MDI unit 70, and stored in the CMOS memory 14.

The interface 15 enables connection with the numerical control device 100 and external equipment 72 such as an adapter. Machining programs and operating programs, various parameters, etc. are read from the external equipment 72 side. In addition, the machining programs and operating programs edited within the numerical control device 100 can be stored in an external storage unit via the external equipment 72. A PMC (programmable machine controller) 16 is commonly called PLC (programmable logic controller). The PMC 16 outputs signals via an I/O unit 17 to auxiliary devices (e.g., actuators such as robot hands for tool exchange) of the machine tool 200 to control by a sequence program (PLC software) built into the numerical control device 100. In addition, after signals of various switches, etc. on a control panel equipped to the main body of the machine tool 200 are received, and doing the necessary signal processing, the PMC 16 transfers to the CPU 11.

The display/MDT unit 70 is a manual data input device equipped with a display, keyboard, etc., and the interface 18 receives commands and/or data from the keyboard of the display/MDI unit 70, and transfers to the CPU 11. The interface 19 is connected to the control panel 71 equipped with a manual pulse generator, etc.

Axis control circuits 30 to 34 of each axis receive the movement command amount of each axis from the CPU 11, and output commands for each axis to the servo amplifiers 40 to 44. The servo amplifiers 40 to 44 receive these commands and drive the servomotors 50 to 54 of each axis. The servomotors 50 to 54 of each axis are equipped with position/speed detectors, feedback the position/speed feedback signals from these position/speed detectors to the axis control circuit 30 to 34, and perform feedback control of the position/speed. It should be noted that position/speed feedback is omitted in this drawing.

A spindle control circuit 60 receives a spindle rotation command for the machine tool 200, and outputs a spindle speed signal to a spindle amplifier 61. The spindle amplifier 61 receives this spindle speed signal, and causes the spindle motor 62 of the machine tool 200 to rotate at the commanded rotation speed to drive the tool. A pulse encoder 63 coupled by gears, a belt or the like to the spindle motor 62, whereby the pulse encoder 63 outputs a return pulse synchronized with the rotation of the spindle, and this return pulse passes through a bus 20 and is read by the CPU 11.

Referring back to FIG. 1, the numerical control device 100 sends parameters to the robot control device 400. The parameters correspond to selection of an operating program to be executed by the robot control device 400, and/or branch processing of the selected operating program, or numerical data such as variables required for the operation sequence and operation. The numerical control device 100 includes a designation screen output unit 110, and reception unit 120, and a signal allocation unit 140 (as a sending unit).

The designation screen output unit 110 outputs, to the display/MDI unit 70, a designation screen described later, which is a screen for designating selection of an operating program for the robot 300, and/or parameters setting the operations of the operating program. Herein, the parameters are information setting a selection of an operating program for controlling the robot 300, and/or operations of the operating program (operating sequence, numerical data required in operation, etc.), which is, for example, information setting the hand type of the robot 300 (single hand or dual hand), or information setting the number and/or arrangement position of a workpiece to be handled by the robot 300.

The reception unit 120 accepts setting information by way of an instruction input by the user using the display/MIDI unit 70 corresponding to the display of the designation screen. The signal allocation unit 140 allocates a parameter setting a selection of an operating program, and/or operations of the operating program based on the setting information accepted by the reception unit 120, as a signal used by the robot control device 400.

The machine tool 200 is a machine tool that performs predetermined machining such as cutting on a workpiece such as a component, based on an operation command outputted by the numerical control device 100. In the present embodiment, the machine tool 200 and robot 300 perform work in combination, and do work jointly within the same work space.

The robot 300, for example, is a 6-axis articulated robot, and has a hand which can grip a workpiece machined by the machine tool 200, or on which to perform machining thereafter. The robot 300 conveys the workpiece, for example, in accordance with an operation command generated by the operating program set in the robot control device 400.

The robot control device 400 is a device which causes a predetermined operation to be performed by the robot 300, by way of controlling the robot 300. The general configuration of the robot control device 400 is substantially the same configuration as that explained for the numerical control device 100 in FIG. 2 except for the point of using a teaching control panel in place of the display/MDI unit 70; therefore, a detailed explanation will be omitted herein. The robot control device 400 includes a receiving unit 410, a program storage unit 420, and a program setting unit 430.

The receiving unit 410 receives parameters from the numerical control device 100. The program storage unit 420 is a storage area which stores various programs for causing the robot control device 400 to operate. The program storage unit 420 stores operating programs corresponding to the parameters received by the receiving unit 410. The program storage unit 420 may store operating programs in advance, or may receive and store operating programs via a network from a server or cloud (not illustrated). In addition, the program storage unit 420 is not limited to storing one operating program, and may store a plurality of operating programs. The program setting unit 430 sets an operating program based on the received parameters. More specifically, the program setting unit 430 uses the received parameters in selection of an operating program, and uses in variables setting operations of the operating program, and in branch processing.

A summary of the respective devices of the production system 1000, and the functional blocks included in the numerical control device 100 and robot control device 400 have been explained above. It should be noted that each of the respective devices included in the above-mentioned production system 100 can be realized by way of hardware, software or a combination of these. Herein, being realized by way of software indicates the matter of being realized by a computer reading and executing programs. As a specific example, the numerical control device 100 can be realized by incorporating application software for realizing the present embodiment into a general numerical control device. In addition, the robot control device 400 can be realized by incorporating application software for realizing the present embodiment into the general control device of the robot 300.

Next, specific examples of performing control of the robot control device 400 using the numerical control device 100 will be explained.

Specific Example 1

Figure 3A:
FIG. 3A is a ladder diagram of first processing executed by a numerical control device illustrated in Specific Example 1 of the present embodiment.

Specific Example 1 is an example of designating the type of robot hand of the robot 300 in the robot control device 400 from the numerical control device 100. FIG. 3A shows a ladder diagram 501 representing first processing executed by the PMC 16 of the numerical control device 100. The processing shown by the ladder diagram 501 is executed by the PLC software in the aforementioned PMC 16. According to this ladder diagram 15, a signal M1 of the numerical control device 100 and a signal R1 sent to the robot control device 400 are allocated as first processing. Herein, signal M1 and signal R1 are each 1 bit.

Figure 3B:
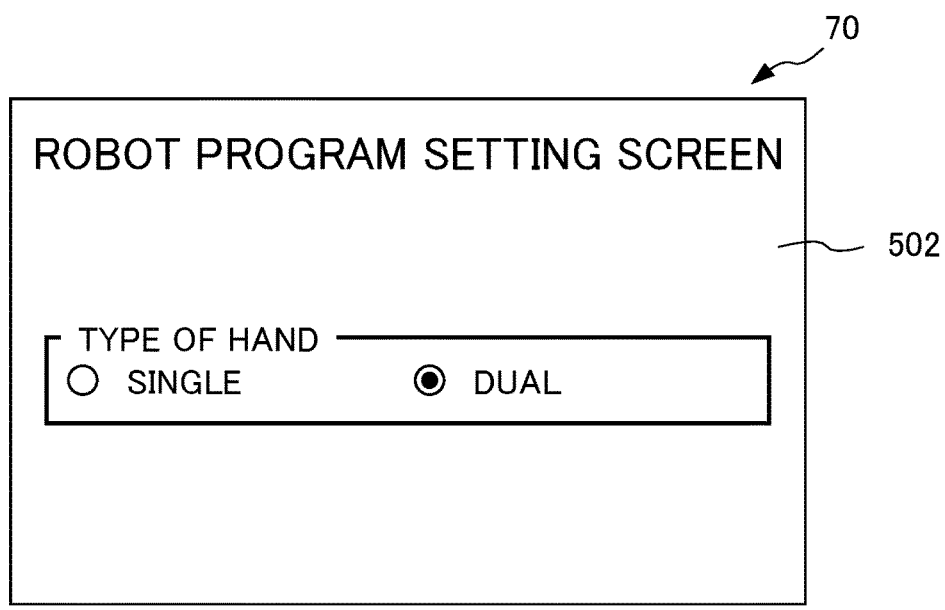
FIG. 3B is a view showing an example of a designation screen. corresponding to first processing.

FIG. 3B shows a designation screen 502 for selecting the hand type of the robot 300. The designation screen 502 is a screen for designating the hand type as single or dual. The designation screen output unit 110 outputs the designation screen 502 to the display/MDI unit 70. By configuring in this way, since the user designates single or dual by manipulating the display/MDI unit 70, the reception unit 120 accepts the designated setting information (single or dual). Then, the signal allocation unit 140 determines the signal M1 on the side of the numerical control device 100 from the setting information according to the processing shown in the ladder diagram 501, and allocates the signal R1 (parameter) on the side of the robot control device 400. The signal allocation unit 140 allocates signal R1=0 in the case of the setting information being single in this case. In addition, the signal allocation unit 140 allocates signal R1=1 in the case of the setting information being dual.

Figure 3C:
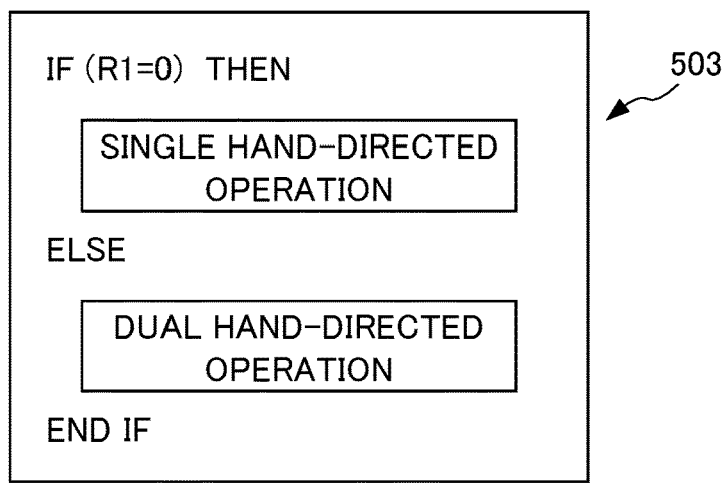
FIG. 3C is a view showing an example of an operating program corresponding to first processing.

FIG. 3C shows an operating program 503 stored in the program storage unit 420 of the robot control device 400. Herein, the production system 1000 shall be a configuration in which the operating program 503 corresponding to the designation screen 502 is stored in the program storage unit 420 in advance. The operating program 503 incorporates as branch processing in advance whether to perform single hand-directed operation or to perform dual hand-directed operation, according to the value of the signal R1.

By configuring in this way, the robot control device 400 is set so as to control the operations of the robot 300 based on the signal R1, by the signal R1 being inputted during execution of the operating program 503 in the robot control device 400. In this example, when the signal R1=0, it is set so as to perform single hand-directed operation in the robot 300, according to the conditional branch processing of the operating program 503. In addition, when the signal R1=1, it is set so as to perform dual hand-directed operation in the robot 300, according to the conditional branch processing of the operating program 503.

Based on the setting information accepted via the designation screen 502 displayed on the display/MDI unit 70 of the numerical control device 100 from the user in this way, the numerical control device 100 (signal allocation unit 140) determines the signal M1 on the side of the numerical control device 100, and executes PLC software set in advance, thereby allocating the signal R1 (parameter) on the side of the robot control device 400. Then, during execution of the operating program 503, the signal R1 is inputted to the robot control device 400, and as a result thereof, the numerical control device 100 can determine the operation sequence of the robot 300.

Specific Example 2

Figure 4A:
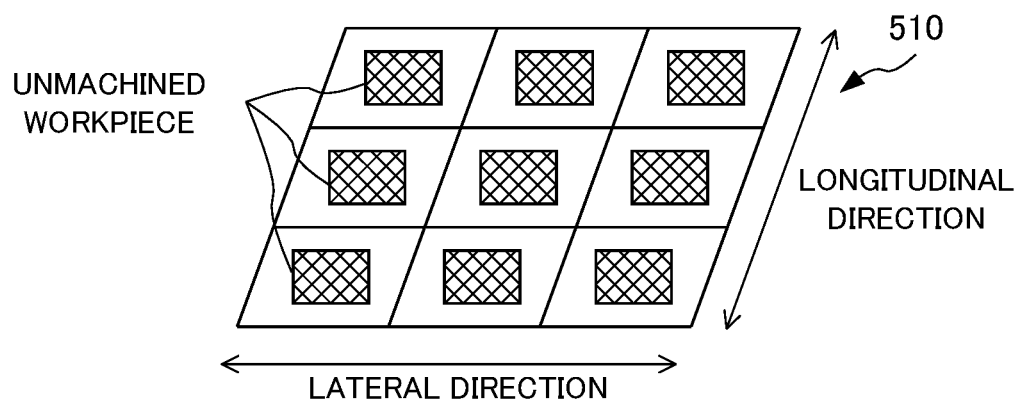
FIG. 4A is a view for explaining a premise of second processing executed by a numerical control device illustrated in Specific Example 2 of the present embodiment.
Figure 4B:
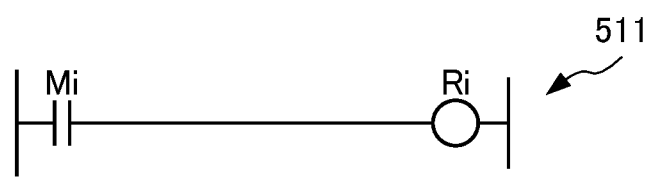
FIG. 4B is a ladder diagram showing second processing.

Specific Example 2 is an example for notifying the number in the lateral direction of unmachined workpieces to the robot control device 400 from the numerical control device 100. The robot control device 400 thereby performs transfer and the like of workpieces only by the number of unmachined workpieces relative to the robot 300. FIG. 4A shows a state 510 in which unmachined workpieces are placed in a grid pattern within a work space. FIG. 4B shows a ladder diagram 511 representing second processing which is executed by the PMC 16 of the numerical control device 100. According to this ladder diagram 511, the signal Mi of the numerical control device 100 and the signal Ri to be sent to the robot control device 400 are allocated as second processing. Herein, i is an integer of 0 to 7.

Figure 4C:
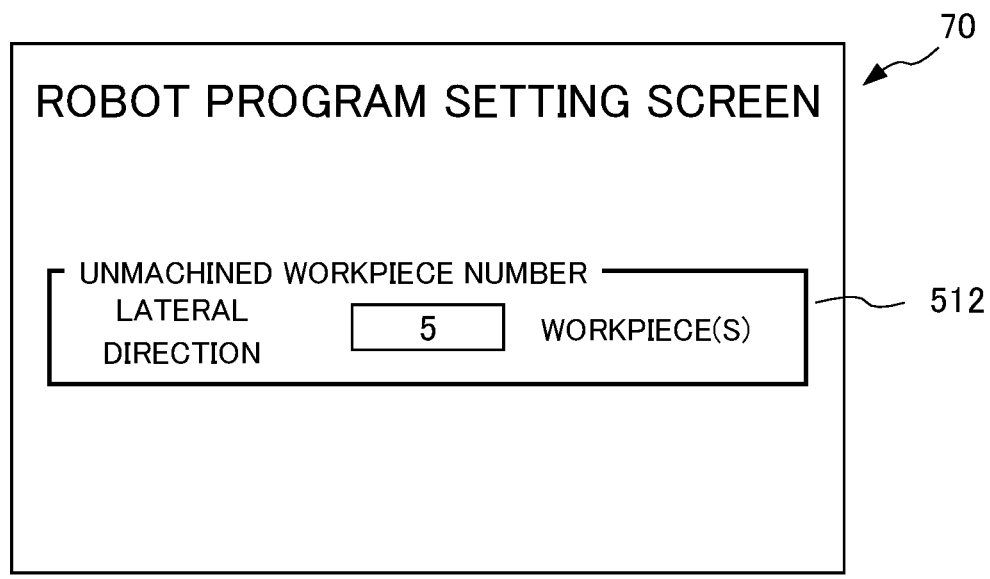
FIG. 4C is a view showing an example of a designation screen corresponding to second processing.

FIG. 4C shows a designation screen 512 for inputting the number in the lateral direction of unmachined workpieces. The designation screen output unit 110 outputs the designation screen 512 to the display/MDI unit 70. By configuring in this way, the user manipulates the display/MDI unit 70 to designate the number by a numerical character; therefore, the reception unit 120 accepts the designated setting information (number in lateral direction of unmachined workpieces). Then, the signal allocation unit 140 determines the signal Mi on the side of the numerical control device 100 from the setting information (number in lateral direction of unmachined workpieces) according to the processing shown in the ladder diagram 511, and allocates the signal Ri on the side of the robot control device 400. The signal allocation unit 140, in this example, establishes the setting information (number in lateral direction of unmachined workpieces) in binary digits and allocates as the signal Mi ($0 \leq i \leq 7$) of 1 byte (=8 bits). For example, in the case of "5" being designated as the setting information (number in lateral direction of unmachined workpieces), as in the example shown in FIG. 4C, the binary digits are 00000101. For this reason, the signal allocation unit 140 can allocate 1 to signal R5 and signal R7, and 0 to from signal R0 to signal R4 and signal R6 on the side of the robot control device 400, respectively, by allocating 1 to signal M5 and signal M7, allocate 0 to from signal M0 to signal M4 and signal M6.

Figure 4D:
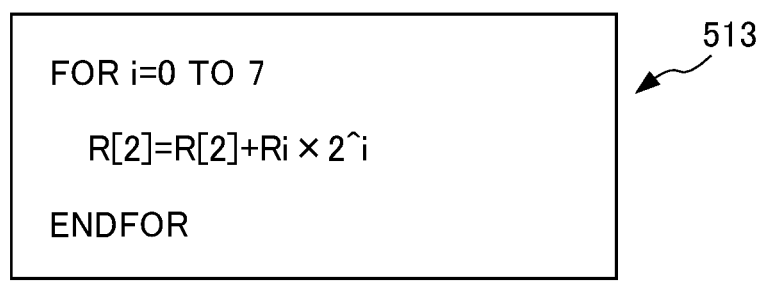
FIG. 4D is a view showing an example of an operating program corresponding to second processing.

FIG. 4D shows an operating program 513 stored in the program storage unit 420 of the robot control device 400. This operating program 513 is for setting the decimal digit value in the R[2], by the value of a signal Ri indicated by binary digits being inputted. Processing using this variable is incorporated into the operating program 513 in advance. By configuring in this way, the robot control device 400 is set so as to control operations of the robot 300 based on the signal Ri, by the signal Ri being inputted to the operating program 513 in the robot control device 400. In this example, in the robot control device 400, by binary digits indicated by the signal Ri being inputted to the variable of the operating program 513, the number in the lateral direction of the unmachined workpiece designated on the designation screen is set in the R[2]. The robot control device 400, by the signal Ri allocated by the setting information being inputted during execution of the operating program 513, is set so as to perform processing of the unmachined workpiece in proportion to the number of unmachined workpieces relative to robots 300.

In this way, based on the setting information accept via the designation screen 512 displayed on the display/MDI unit 70 of the numerical control device 100 by the user, the numerical control device 100 (signal allocation unit 140) determines the signal Mi on the side of the numerical control device 100, and executes PLC software set in advance, thereby allocating the signal Ri (parameter) on the side of the robot control device 400 from the signal Mi on the side of the numerical control device 100. Then, during execution of the operating program 513, the signal Ri (parameter) is inputted by the robot control device 400, and as a result thereof, the numerical control device 100 can perform setting of the numerical values requiring input, in the robot control device 400.

Specific Example 3

Specific Example 3 is an example arrived at by combining Specific Example 1 and Specific Example 2, and can be used in the actual work by the robot 300. In Specific Example 2, by designating the number in the lateral direction of unmachined workpieces from the numerical control device 100, the number in the lateral direction of unmachined workpieces is set in the operating program 513 of the robot control device 400. However, in the case of the robot 300 actually performing processing on unmachined workpieces, the information of simply number in the lateral direction is not enough, and information such as the arrangement form of workpieces and the arrangement interval between workpieces, etc. is also required.

Figures 5A, 5B:
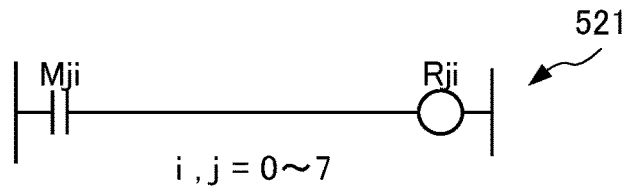
FIG. 5A is a ladder diagram showing third processing executed by a numerical control device illustrated in Specific Example 3 of the present embodiment.
FIG. 5B is a views showing an example of an allocation table according to third processing.

FIG. 5A shows a ladder diagram 521 representing third processing to be executed by the PMC 16 of the numerical control device 100. According to this ladder diagram 521, the signal Mji of the numerical control device 100 and the signal Rji to be sent to the robot control device 400 are allocated as third processing. Herein, i and j both are integers of 0 to 7. FIG. 5B shows an allocation table 525 in which the signal Mji on the side of the numerical control device 100, and the signal Rji on the side of the robot control device 400 are allocated for every setting item. Since part of the setting information is expressed in decimal digits, the signal allocation unit 140 converts the setting information decimal digits into binary digits, and allocates the signal Mji as signal Rji.

Figure 6A:
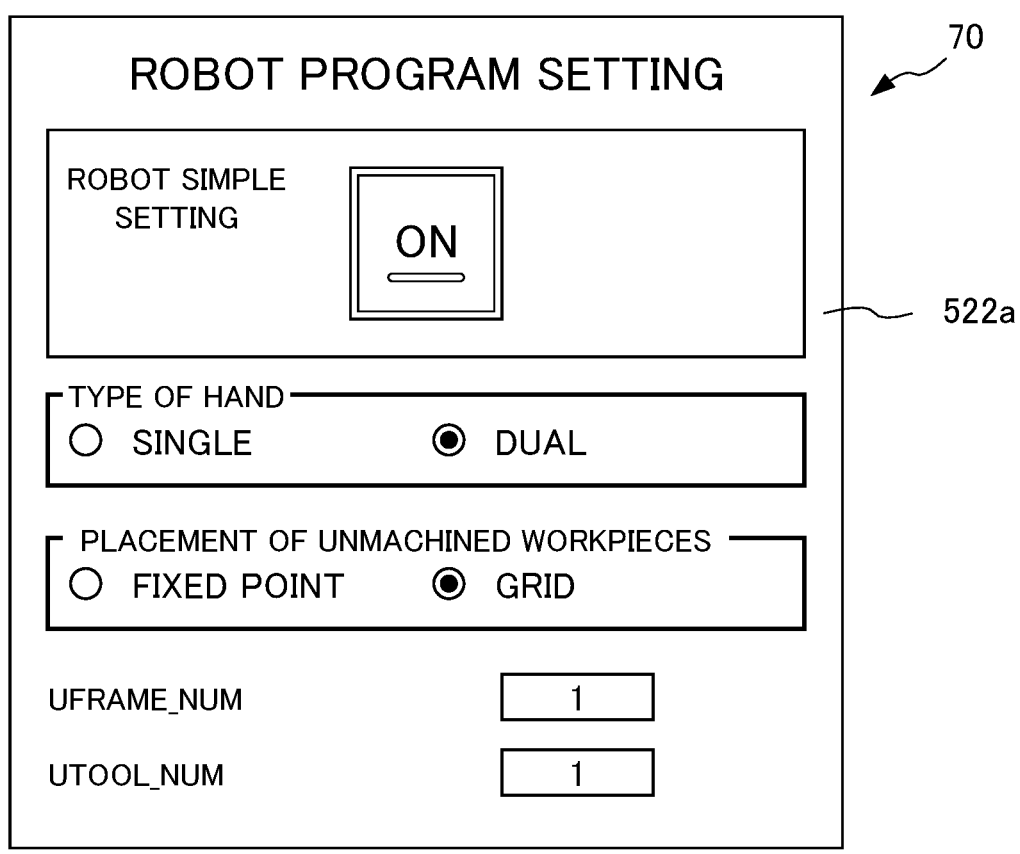
FIG. 6A is a view showing an example of a designation screen corresponding to third processing.
Figure 6B:
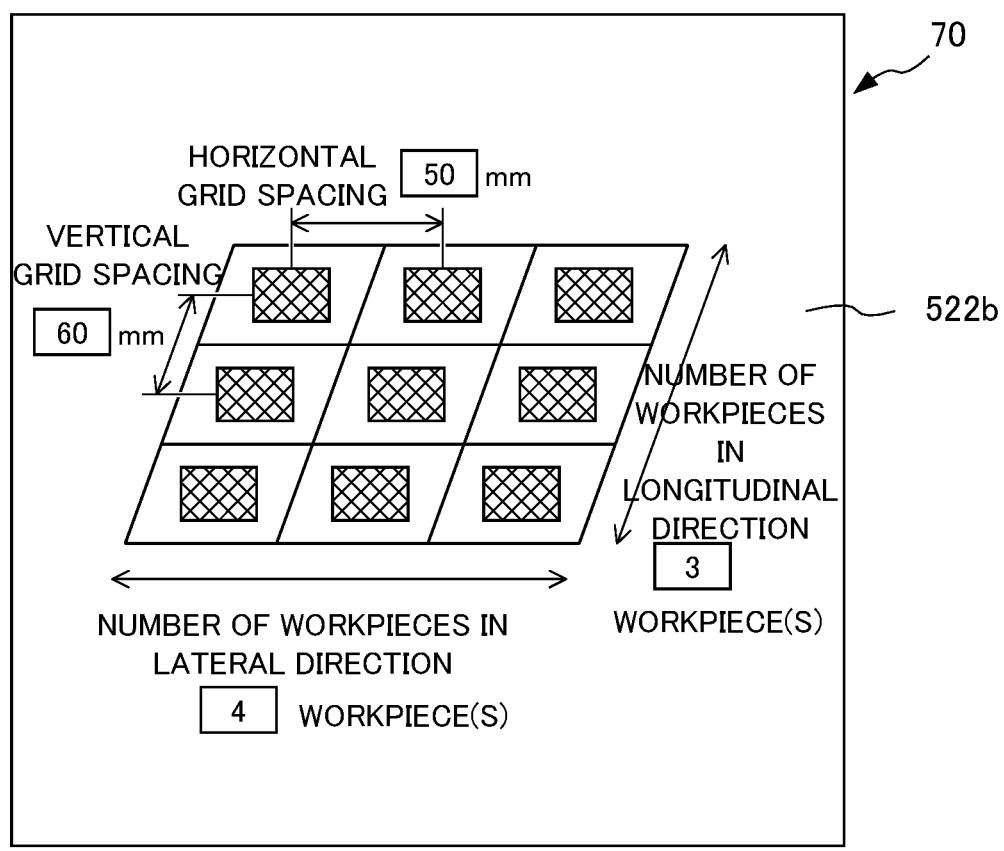
FIG. 6B is a view showing an example of a designation screen corresponding to third processing.

FIG. 6A and FIG. 6B show the designation screen 522a and designation screen 522b corresponding to the setting items of FIG. 5B. The designation screen output unit 110 outputs the designation screen 522a and designation screen 522b to the display/MDI unit 70. By configuring in this way, the user designates information corresponding to various setting items, at locations corresponding to the designation screen 522a and designation screen 522b, via the display/MDI unit 70. When this is done, the reception unit 120 accepts the designated setting information (information corresponding to the various setting items). Then, the signal allocation unit 140 determines the signal Mji on the side of the numerical control device 100 from the setting information (information correspond to the various setting items) according to the processing shown in the ladder diagram 521 (refer to FIG. 5A), and allocates the signal Rji on the side of the robot control device 400 (refer to FIG. 5B).

Figure 7:
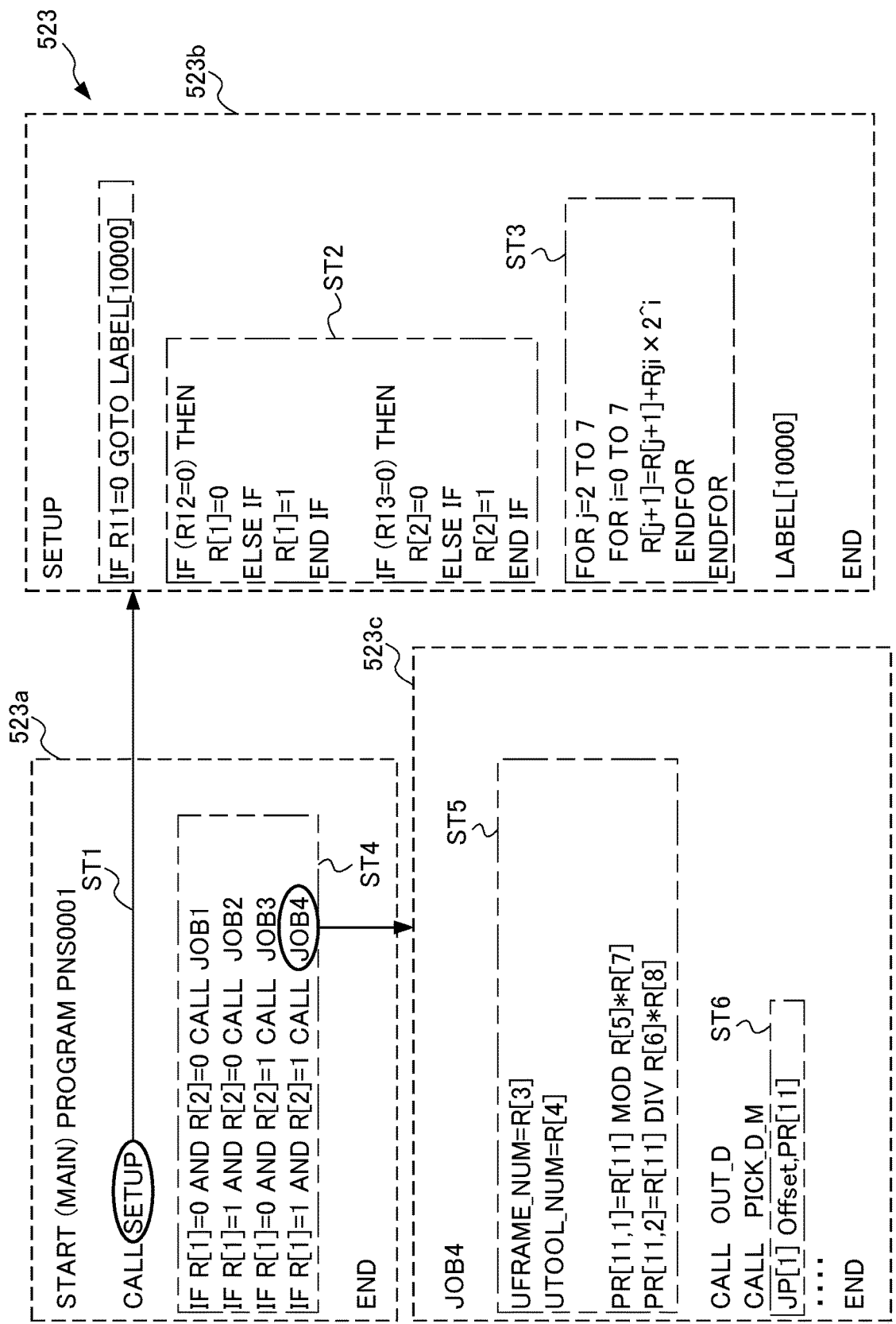
FIG. 7 is a view showing an example of an operating program according to third processing.

By configuring in this way, the signal Rji is inputted during execution of the operating program 523 of FIG. 7 in the robot control device 400, whereby the robot control device 400 is set so as to control operation of the robot 300 based on the signal Rji.

The robot control device 400, when starting the operating program 523, first executes a main program 523a. When this is done, the robot control device 400 calls a SETUP program 523b (Step ST1). The robot control device 400, in the case of a robot simple setting being ON (refer to FIG. 6A) in the SETUP program 523b, performs processing of determining values of a R[1] and R[2], which are register variables (Step ST2), and conversion processing to decimal digits from binary digits determining the values of R[3] to R[4], which are register variables (Step ST3).

Herein, by the value of signal R2i ($0 \leq i \leq 7$) indicated in binary digits being inputted to the R[3], similarly to Specific Example 2, the uframe_num designated on the designation screen 522a is set. Similarly, by the values of the signals R3i, R4i, R5i, R6i and R7i ($0 \leq i \leq 7$) indicated in binary digits being inputted to the R[4], R[5], R[6], R[7] and R[8], respectively, the utool_num, longitudinal workpiece number, lateral workpiece number, vertical grid spacing, and horizontal grid spacing designated on the designation screens 522a and 522b, respectively, are set.

Thereafter, the robot control device 400 returns to the main program 523a, and selects a calling JOB from the hand type and way of placing the unmachined workpiece, which are values determined by the SETUP program 523b in the main program 523a (Step ST4). In the example shown in FIG. 7, JOB program 523c of JOB4 is selected. The robot control device 400 can determine the operation of the robot 300 based on the longitudinal workpiece number, lateral workpiece number, vertical grid spacing and horizontal grid spacing, which are set in R[5], R[6], R[7] and R[8] in the JOB program 523c thus selected (Steps ST5 and ST6). In this processing, by the signal Rji allocated by the setting information being inputted during execution of the operating program 523, the robot control device 400 is set so as to perform processing on the unmachined workpiece according to the hand type and way of placing of the unmachined workpiece relative to the robot 300.

Based on the setting information (information corresponding to various setting items) accepted via the designation screens 522a and 522b displayed on the display/MDI unit 70 of the numerical control device 100 by the user in this way, the numerical control device 100 (signal allocation unit 140) determines the signal Mji on the side of the numerical control device 100, and executes the PLC software set in advance, thereby allocating the signal Rji (parameter) on the side of the robot control device 400 from the signal Mji on the side of the numerical control device 100. Then, the signal Rji (parameter) is inputted by the robot control device 400 during execution of the operating program 523, and as a result thereof, the numerical control device 100 can make selection of branch processing within the operating program 523, and/or input of numerical values required in in variables for setting the operations of the operating program 523, in the robot control device 400. It should be noted that Specific Example 3 may also include the way of placing of the machined workpieces, in addition to the hand type and way of placing of the unmachined workpieces.

Specific Example 4

Specific Example 4 is an example designating the hand type of the robot 300 in the robot control device 400 from a numerical control device 100-2. In Specific Example 4, similarly to Specific Example 1, the first processing is executed, and the robot control device 400 executes the operating program 503 (refer to FIG. 3C) illustrated in Specific Example 1. Herein, it differs from Specific Example 1 in the point of the numerical control device 100-2 using a switch S1 in place of a designation screen.

Figure 8A:
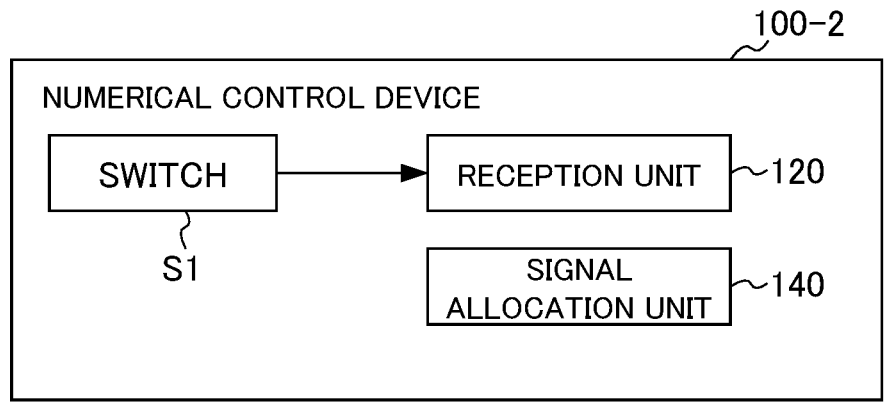
FIG. 8A is a functional block diagram of a numerical control device illustrated in Specific Example 4 of the present embodiment.
Figure 8B:
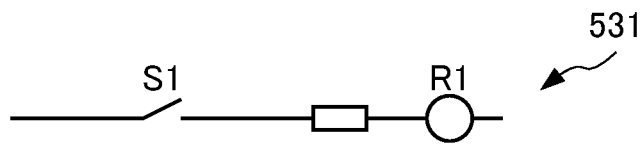
FIG. 8B is a circuit diagram showing first processing illustrated in Specific Example 4.

FIG. 8A is a functional block diagram of the numerical control device 100-2. The numerical control device 100-2, compared with the numerical control device 100 (refer to FIG. 1), is similar to the numerical control device 100 other than including the switch S1 and not the designation screen output unit 110. The switch S1 is hardware for designating the hand type of the robot 300. FIG. 8B shows a circuit diagram 531 representing the logic circuit of the numerical control device 100-2. According to this circuit diagram. 531, as the first processing, the switch S1 shown in FIG. 8C included in the numerical control device 100-2, and the signal R1 to be sent to the robot control device 400 are allocated.

Figure 8C:
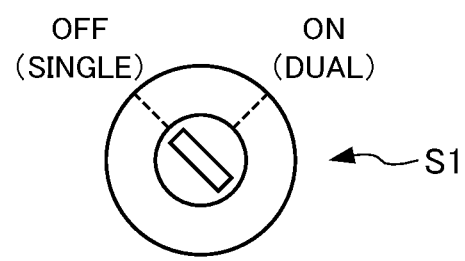
FIG. 8C is a view showing an example of a switch corresponding to first processing illustrated in Specific Example 4.

The switch S1 shown in FIG. 8C is a member switching between ON and OFF. The reception unit 120 receives ON or OFF of current based on the ON/OFF operation of the switch S1. The signal allocation unit 140 allocates ON/OFF of current based on the operation of the switch S1 to ON/OFF, as the signal R1. In this example, dual is designated as the hand type of the robot 300 by ON of switch S1, and single is designated by OFF of switch S1.

As mentioned above, the operating program 503 is stored in the program storage unit 420 of the robot control device 400. Whether the operating program 503 performs single hand-directed operation or performs dual hand-directed operation according to the value of the signal R1, is incorporated as branch processing in advance. By configuring in this way, by the signal R1 being inputted during execution of this operating program 503 (refer to FIG. 3C) in the robot control device 400, the robot control device 400 is set so as to control operation of the robot 300 based on the signal R1. The processing thereafter is similar to that explained in Specific Example 1.

In this way, the numerical control device 100-2 allocates the signal R1 (parameter) on the side of the robot control device 400 according to ON/OFF of current, in accordance with the manipulation by the user of the switch S1 of the numerical control device 100-2. Then, the signal R1 is inputted by the robot control device 400, and as a result thereof, the numerical control device 100-2 can determine the operation sequence of the robot 300.

Specific Example 5

Figure 9A:
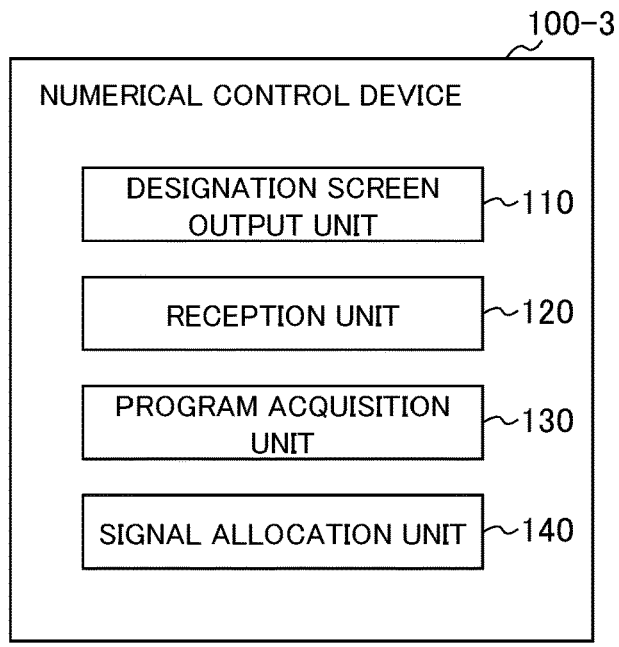
FIG. 9A is a functional block diagram of a numerical control device illustrated in Specific Example 5 of the present embodiment.
Figure 9B:
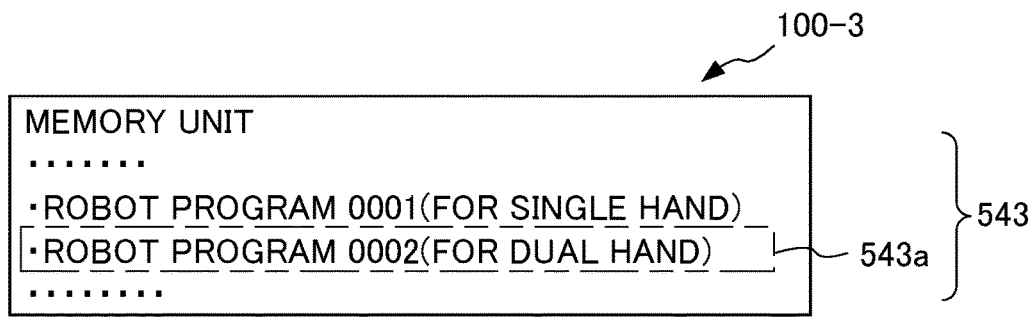
FIG. 9B is a view showing an example of operating programs stored in a numerical control device illustrated in Specific Example 5.
Figure 9C:
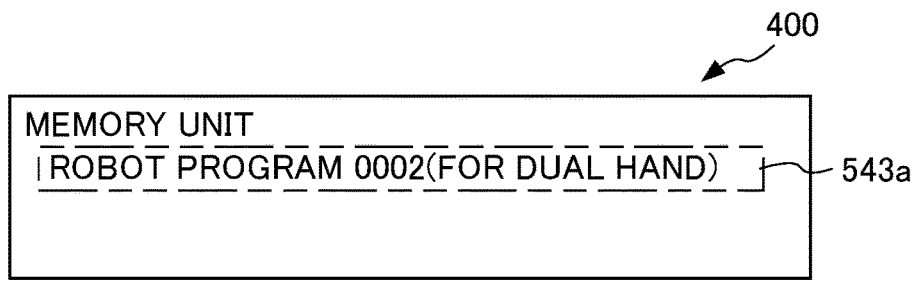
FIG. 9C is a view showing an example of an operating program stored in a program control device illustrated in Specific Example 5.

Specific Example 5 is an example of designating the hand type of the robot 300 in the robot control device 400 from a numerical control device 100-3. In Specific Example 5, the numerical control device 100-3 sends an operating program 543a possessed in the memory to the robot control device 400, and executes the operating program 543a with the robot control device 400. FIG. 9A is a functional block diagram of the numerical control device 100-3. Compared to the numerical control device 100 (refer to FIG. 1), the numerical control device 100-3 further has a program acquisition unit 130.

The program acquisition unit 130 acquires the operating program 543a corresponding to setting information accepted by the reception unit 120, and sends the operating program 543a to the robot control device 400. The operating program 543a used by the robot control device 400 is stored in the memory unit (for example, CMOS memory 14, etc.) of the numerical control device 100. As shown in FIG. 9E, in the memory unit of the numerical control device 100, a plurality of different operating programs 543 is stored. It should be noted that the operating program 543 may be stored in a file server, cloud or the like which are accessible via the network N.

In this example, the processing executed by the PMC 16 of the numerical control device 100 is similar to the first processing (processing according to ladder diagram 501 shown in FIG. 3A). In addition, the designation screen is similar to the designation screen 502 shown in FIG. 3B explained in Specific Example 1. In the case of the user designating dual, for example, on the designation screen, the reception unit 120 accepts the designated setting information.

Next, the program acquisition unit 130 acquires, from the memory unit in the numerical control device 100, the operating program 543a corresponding to dual, which is the setting information accepted by the reception unit 120, and sends the operating program 543*a* to the robot control device 400. The receiving unit 410 of the robot control device 400 receives the operating program 543*a*. Then, the program setting unit 430 saves the operating program 543*a* in the memory unit of the robot control device 400. The subsequent processing of the signal allocation unit 140 is similar to Specific Example 1, and thus explanation thereof will be omitted. It should be noted that the aforementioned shows the processing of sending the signal R1 as the processing according to the same ladder diagram as Specific Example 1. However, in the case of not having branch processing, variables, etc. according to the parameters in the operating program, it may simply send the operating program 543*a* to the robot control device 400.

In this way, the numerical control device 100-3 acquires the operating program 543*a* to be executed by the robot control device 400, according to the manipulation on the display/MDI unit 70. Then, the operating program 543*a* is sent from the numerical control device 100-3 to the robot control device 400.

According to the above, in the production system 1000, by the numerical control device 100 sending a parameter to the robot control device 400 as a signal, the robot control device 400 selects an operating program based on the received signal, and/or inputs numerical values into variables of the operating program to cause the robot 300 to operate. In other words, the user can perform setting in the robot control device 400 from the numerical control device 100. Consequently, even if the user is unexperienced with manipulation of the robot control device 400, since manipulation can be performed from the numerical control device 100, it is useful. In addition, setting thereof, due to being selected from the designation screen or inputting numbers, can be simply input by the user.

Furthermore, in the present embodiment, by allocating signals between the machine tool side (numerical control device 100) and robot side (robot control device 400) using PLC software or a logic circuit, a configuration is made that sends a selection of an operating program of the robot 300, and/or parameters setting the operation of the operating program. By configuring in this way, it is possible to realize the present invention with an existing configuration, without requiring adding or modifying a special configuration to the machine tool (numerical control device 100) and robot (robot control device 400). In addition, by employing allocation of a signal according to PLC software or a logic circuit for which those skilled in the art are used to handling, it is possible for one skilled in the art who is used to the handling of a machine tool (numerical control device 100) to easily realize the present invention. By setting, or setting and changing, the PLC software or logic circuit, it is possible to set any parameters on the robot side (robot control device 400) from the machine tool side (numerical control device 100), and thus a system change and expansion are very easy, and moreover, a system change can be performed with low cost.

The program including the operating program used in the present invention can be stored using various types of non-transitory computer readable media, and supplied to computers. The non-transitory computer readable media includes various types of tangible storage media. Examples of non-transitory computer readable media include magnetic media (for example, flexible disks, magnetic tape, hard disk drive), magneto-optical recording media (for example, magneto-optical disk), CD-ROM (Read Only Memory), CD-R, CD-R/W, and semiconductor memory (for example, mask ROM, PROM (Programmable RM, EPROM (Erasable PROM), flash ROM, RAM (random access memory)). In addition, the programs may be supplied to a computer by way of various types of transitory computer readable media. Examples of transitory computer readable media include electrical signals, optical signals and electromagnetic waves. The transitory computer readable media can supply programs to a computer via wired communication paths such as electrical wires and optical fiber, or a wireless communication path.

In addition, the aforementioned embodiment is a preferred embodiment of the present invention; however, it is not to limit the scope of the present invention to only the above-mentioned embodiment, and implementation in forms arrived at by conducting various modifications of a scope not departing from the gist of the present invention is possible.

Modified Example 1

In the aforementioned embodiment, a configuration in which the numerical control device controls one machine tool is explained; however, it is not limited thereto. The numerical control device may be a device that controls a plurality of machine tools. In addition, the robot control device may also be a device that controls a plurality of robots. Furthermore, a plurality of the numerical control devices and a plurality of robot control devices may be connected via a network.

Modified Example 2

In the aforementioned embodiment, it is explained as a configuration in which the numerical control device and machine tool are separate devices, and it is explained as a configuration in which the robot and the robot control device are separate devices; however, it is not limited thereto. It may be a configuration equipping the numerical control device to the machine tool, and may be a configuration equipping the robot control device to the robot.

Modified Example 3

In the aforementioned embodiment, a configuration in which one operating program is stored in advance in the robot control device is explained as an example; however, it is not limited thereto. A plurality of operating programs may be stored in the robot control device, and it may be configured to be able to select one operating program according to a parameter. In this case, for example, it may be configured so as to select the operating program according to the number of parameters.

Modified Example 4

In the aforementioned Specific Examples of the embodiment, a parameter for setting selection of the operating program of the robot and/or operations of the operating program is first converted to the signal M on the side of the numerical control device 100, afterwards, the signal M on the side of the numerical control device 100 is allocated to signal R on the side of the robot control device 400 according to PLC software or a logic circuit such as a switch, whereby this parameter is sent to the robot control device 400 from the numerical control device 100; however, it is not limited thereto. For example, it may be configured so as to send this parameter to the robot control device via a network, for example, as a sending unit of the numerical control device. In this case, the robot control device may be configured so as to receive this parameter, and then a program setting unit inserts this parameter thus received into the operating program. By configuring in this way, it is possible to exert similar effects as the Specific Examples of the embodiments.

EXPLANATION OF REFERENCE NUMERALS 100, 100-2, 100-3 numerical control device
110 designation screen output unit
120 reception unit
130 program acquisition unit
140 signal allocation unit
200 machine tool
300 robot
400 robot control device
410 receiving unit
420 program storage unit
430 program setting unit
1000 production system

What is claimed is:

1. A machine tool control device which is connected to a robot control device for controlling a robot, and controls a machine tool used in combination with the robot, the machine tool control device comprising:
   a reception unit for accepting, by a user inputting an instruction to an operating member in the machine tool control device, setting information including at least one of a type of hand of the robot or information relating to an arrangement of an unmachined workpiece for the robot;
   a processor that determines a signal of the machine tool control device based on the setting information and sets a parameter of the robot control device based on the setting information and the signal, the parameter indicating: an operating program, and an operation of the operating program based on the setting information accepted by the reception unit; and
   a sending unit for sending the parameter to the robot control device, the parameter being for use by the robot control device in selecting an operating program in the robot control device and for use by the robot control device in setting an operation of the operating program in the robot control device.

2. The machine tool control device according to claim 1, wherein the parameter selects the operating program from a plurality of operating programs which are executable by the robot control device.

3. The machine tool control device according to claim 1, wherein the parameter inputs a numerical value into a variable of the operating program.

4. The machine tool control device according to claim 1, wherein the parameter corresponds to branch processing of the operating program.

5. The machine tool control device according to claim 1, wherein the parameter corresponds to a type of hand, arrangement of an unmachined workpiece and arrangement of a machined workpiece.

6. The machine tool control device according to claim 1, further comprising:
   a display which displays a screen; and
   a designation screen output unit for outputting a designation screen for designating the setting information to the display,
   wherein the reception unit accepts the setting information according to an instructions input corresponding to display on the designation screen.

7. The machine tool control device according to claim 1, further comprising:
   a switch for designating the setting information,
   wherein the reception unit accepts a manipulation result of the switch as the setting information, and
   wherein the processor generates an input signal relative to the robot control device which corresponds to the parameter, based on a manipulation result of the switch.

8. The machine tool control device according to claim 1, further comprising:
   a program acquisition unit for acquiring the operating program which corresponds to the setting information accepted by the reception unit and sent to the robot control device, and then sending the operating program thus acquired to the robot control device.

9. The machine tool control device according to claim 1, wherein the sending unit sends, to the robot control device, the parameter setting the selection of the operating program stored in the robot control device, and/or setting an operation of the operating program.

10. A production system comprising:
    a robot control device that controls a robot; and
    a machine tool control device that is connected to the robot control device, and controls a machine tool which is used in combination with the robot,
    wherein the machine tool control device includes:
    a reception unit for accepting, by a user inputting an instruction to an operating member in the machine tool control device, setting information including at least one of a type of hand of the robot or information relating to an arrangement of an unmachined workpiece for the robot;
    a processor that determines a signal of the machine tool control device based on the setting information and sets a parameter of the robot control device based on the setting information and the signal, the parameter indicating: an operating program, and an operation of the operating program based on the setting information accepted by the reception unit; and
    a sending unit for sending the parameter to the robot control device, the parameter being for use by the robot control device in selecting an operating program in the robot control device and for use by the robot control device in setting an operation of the operating program in the robot control device, and
    wherein the robot control device includes:
    a receiving unit for receiving the parameter; and
    a program setting unit for selecting the operating program of the robot based on the parameter received by the receiving unit, and setting an operation of the operating program thus selected.

* * * * *